United States Patent
Homan et al.

(10) Patent No.: US 7,335,243 B2
(45) Date of Patent: Feb. 26, 2008

(54) MODULAR BIOSAFETY CONTAINMENT APPARATUS AND SYSTEM

(76) Inventors: Jane Homan, 3352 Chapel Hill Rd., Hillpoint, WI (US) 53937; Lee H. Thompson, 967 NE. Paula Dr., Bend, OR (US) 97701

(*) Notice: Subject to any disclaimer, the term of this patent is extended or adjusted under 35 U.S.C. 154(b) by 593 days.

(21) Appl. No.: 10/420,254

(22) Filed: Apr. 22, 2003

(65) Prior Publication Data

US 2006/0107635 A1    May 25, 2006

Related U.S. Application Data

(60) Provisional application No. 60/374,402, filed on Apr. 22, 2002.

(51) Int. Cl.
*F24F 7/10* (2006.01)
*B08B 15/00* (2006.01)

(52) U.S. Cl. .............. 55/385.2; 55/DIG. 18; 55/DIG. 46; 454/187; 128/205.11; 128/205.26; 600/21; 135/116; 135/119; 135/127

(58) Field of Classification Search .............. 55/385.2, 55/DIG. 18, DIG. 46; 454/187; 128/205.11, 128/205.26; 600/21; 135/116, 119, 127
See application file for complete search history.

(56) References Cited

U.S. PATENT DOCUMENTS

| | | | | |
|---|---|---|---|---|
| 3,601,031 A | * | 8/1971 | Abel et al. | 454/187 |
| 3,766,844 A | * | 10/1973 | Donnelly et al. | 454/238 |
| 4,202,676 A | * | 5/1980 | Pelosi et al. | 96/416 |
| 4,409,889 A | * | 10/1983 | Burleson | 454/187 |
| 4,528,941 A | | 7/1985 | Spengler | |
| 4,537,035 A | * | 8/1985 | Stiles | 62/89 |
| 4,604,111 A | | 8/1986 | Natale | |
| 4,704,951 A | * | 11/1987 | Pruchon | 454/58 |
| 4,732,592 A | * | 3/1988 | Spengler | 55/356 |
| 4,900,342 A | | 2/1990 | Spengler | |
| 4,905,578 A | * | 3/1990 | Curtis et al. | 454/229 |
| 4,923,352 A | * | 5/1990 | Tamura et al. | 414/225.01 |
| 5,004,483 A | * | 4/1991 | Eller et al. | 95/10 |
| 5,039,321 A | * | 8/1991 | Satoh et al. | 96/361 |
| 5,090,972 A | * | 2/1992 | Eller et al. | 95/10 |
| 5,099,751 A | * | 3/1992 | Newman et al. | 454/238 |
| 5,326,316 A | * | 7/1994 | Hashimoto et al. | 454/187 |
| 5,597,354 A | * | 1/1997 | Janu et al. | 454/229 |
| 5,607,647 A | * | 3/1997 | Kinkead | 422/122 |
| 5,626,820 A | * | 5/1997 | Kinkead et al. | 422/122 |
| 5,645,480 A | * | 7/1997 | Spengler | 454/187 |
| 5,713,791 A | * | 2/1998 | Long et al. | 454/187 |
| 5,972,060 A | * | 10/1999 | O'Halloran et al. | 55/385.2 |
| 6,119,689 A | * | 9/2000 | Korman | 128/205.29 |
| 6,328,775 B1 | * | 12/2001 | Fuchs | 55/385.2 |
| 6,383,241 B1 | * | 5/2002 | Janus et al. | 55/385.2 |

(Continued)

OTHER PUBLICATIONS

Advertisement—bioBubble—Airlock.

(Continued)

*Primary Examiner*—Duane Smith
*Assistant Examiner*—Minh-Chau T. Pham
(74) *Attorney, Agent, or Firm*—Casimir Jones, S.C.

(57) ABSTRACT

The present invention relates to apparatus and systems for isolating hazardous agents and organisms from their handlers and the public. In particular, the present invention relates to modular negative pressure biological containment chambers.

19 Claims, 2 Drawing Sheets

U.S. PATENT DOCUMENTS

| | | | |
|---|---|---|---|
| 6,383,242 B1 * | 5/2002 | Rogers et al. | 55/385.2 |
| 6,508,850 B1 * | 1/2003 | Kotliar | 55/385.2 |
| 6,692,348 B1 * | 2/2004 | Cauthorne | 454/230 |
| 2005/0160706 A1 * | 7/2005 | Kim et al. | 55/385.2 |

OTHER PUBLICATIONS

Advertisement—bioBubble—Air Shower.
Advertisement—bioBubble—HEPA Vacuum.
Advertisement—bioBubble—Diffusion Head.
Advertisement—bioBubble—Quarantine Unit.
Advertisement—bioBubble—Changing Station.
Advertisement—bioBubble—Bedding Disposal Unit.
Advertisement—bioBubble—Rack Covers.
Advertisement—bioBubble—Taconic Farms, Inc.
Advertisement—bioBubble—.
Advertisement—bioBubble—Clean Rooms.
Advertisement—bioBubble—Piedmond Research Center.
Keller et al., Low-Cost Class 100 Clean Room, reprinted from LabAnimal Magazine.
Advertisement—bioBubble—Affordable Sterile SurgicalSuites.
Advertisement—Interchangeable CeilingModules—for the Ideal Work Environment—Mar. 29, 2002.
Advertisement—Sampel Order Mar. 29, 2002.
Advertisement—Hardwall Cleanroom—Mar. 29, 2002.
Advertisement—Clean Room Specifications -National Partitions—inplant—Mar. 29, 2002.
Advertisement—Prodcuts—Clean Rooms—National Partitions—Mar. 29, 2002.
MSS Cleanroom Technology, upvc corrosion resistance.

* cited by examiner

MODULAR BIOSAFETY CONTAINMENT APPARATUS AND SYSTEM

This application claims the benefit of Provisional Application 60/374,402, filed Apr. 22, 2002.

FIELD OF THE INVENTION

The present invention relates to apparatus and systems for isolating hazardous agents and organisms from their handlers and the public. In particular, the present invention relates to modular negative pressure biological containment chambers.

BACKGROUND OF THE INVENTION

The growing awareness of potential acts of bioterrorism from both international and domestic terrorist groups has accentuated concern about the ability of the nation's laboratory infrastructure to respond to a widespread threat, and has increased concerns about the security of biological and chemical agents handled in research environments. While the potential of biological and chemical warfare and terrorism is neither new nor previously unrecognized, the actual implementation of such a bioterrorist attack on US soil sharply increased public and worker concern. It also increases the probability that other terror groups will seek to follow suit now that the vulnerabilities have been exposed.

In particular, the anthrax attacks of late 2001 highlighted major vulnerabilities of the federal and corporate mail and package handling systems to adequately contain biological and chemical agents. The contamination of the Hart senate office building exposed the basic vulnerability of office complex design to bioterror agents delivered in the mail, or by other means.

In response to these actual and perceived threats, there has been a dramatic increase in funding, both at home and abroad, for research directed to furthering our understanding of bioterrorism agents and to developing more effective countermeasures. For example, biodefense expenditures in the 2002 U.S. budget amounted to $1.4 billion; a further supplemental appropriation in the wake of September 11 added an additional $3.7 billion. The Presidents 2003 budget, summarized in the document "Securing the Homeland, Strengthening the Nation" (Policies in Focus: February 2002) proposed $5.89 billion for defense against bioterrorism. This increase in research activity is heavily straining the small number of existing research facilities capable of handling the most potentially dangerous infectious agents. Thus, as the world prepares itself for the reality of bioterrorism, practical and cost effective approaches are being sought for rapidly strengthening laboratory infrastructure to higher levels of biocontainment.

There have been attempts to provide improved biological containment facilities to meet these growing demands. However, currently available biological containment chambers are often expensive and difficult to retro fit into existing structures especially when one considers the short time periods available for attempting to control potential outbreaks of infectious agents. What are needed are more cost effective and readily adaptable biological containment chambers.

SUMMARY OF THE INVENTION

The present invention relates to apparatus and systems for isolating hazardous agents and organisms from their handlers and the public. In particular, the present invention relates to modular negative pressure biological containment chambers.

In some embodiments, the containment chamber(s) of the present invention are configured for employment (e.g., installed) in a preexisting space (e.g., a room in a building or the facility, a vehicle, or a trailer, etc.).

In some other embodiments, an outer chamber that holds (e.g., encloses) one or more containment chamber is also provided as a part of some biological containment apparatuses. In some embodiments, the outer chamber and the inner chamber(s), enclosed therein, are configured for employment (e.g., installed) inside of a preexisting space, such as a building, facility, vehicle, or a trailer. In further embodiments, the outer chamber further comprises a biological containment chamber.

In a preferred embodiment, the present invention provides a biological containment apparatus comprising a containment chamber configured for employment in a preexisting space, a first air filtration system and a second air filtration system, wherein said first air filtration system exhausts air from inside said containment chamber and said second air filtration system draws air into said containment chamber, a sealable portal for ingress and egress to said containment chamber, and an air pressurization system, wherein said air pressurization system provides negative pressurization in said containment chamber.

In some of these embodiments, the preexisting space comprises a confined space. In further embodiments, the confined space comprises a laboratory. In other embodiments, the confined space comprises a room in a federal building. In some of these embodiments, the federal building is a U.S. Post Office. In yet other embodiments, the confined space is in a commercial building (e.g., business offices, hospitals, shopping centers, etc.). In still further embodiments, the confined space is in a state building (e.g., statehouse, office buildings, court buildings, jailhouses, legislative buildings, etc.) or a city/county building. In still further embodiments, the confined space comprises the interior of a motor vehicle. In yet other embodiments, the space comprises a trailered vehicle. The present invention is not limited however to any particular preexisting space, nor to any particular confined space. The present invention is not limited by the size, shape, configuration, or nature of the preexisting space. Indeed, any suitable preexisting space is contemplated for deployment of the biological containment apparatuses of the present invention. In some other embodiments, the biological containment chamber(s) of the present invention are configured (e.g., installed) as part of the construction of new space (e.g., building, motor vehicle, trailer, etc.).

Preferred embodiments of the present invention provide containment chamber(s) providing negative pressurization in a variety of environments and spaces. In preferred embodiments, the containment chambers comprise a modular construction. It is contemplated that modular construction provided in some embodiments, allows the user to more rapidly deploy the invention in preexisting spaces.

In some embodiments, the biological containment apparatus further comprises a first air filtration system comprising a filter of particles 0.3 μm and greater (e.g., HEPA filter). In still other embodiments, the first air filtration system comprises a filter of particles 0.128 μm and greater (e.g., a ULPA filter). Likewise, in some embodiments, the biological containment apparatus further comprises a second air filtration system comprising a filter of particles 0.3 μm and greater (e.g., HEPA filter). In still other embodiments, the second air filtration system comprises a filter of particles 0.128 μm and greater (e.g., a ULPA filter).

The present invention is not limited to any particular air filtration system or filter. Indeed, in some embodiments, one or more HEPA, ULPA, electrostatic, and charcoal filters may be employed signally or in combination.

In preferred embodiments, the first air filtration system exhausts air from inside the containment chamber to the exterior of the preexisting space (e.g., out doors).

In other preferred embodiments, the second air filtration system draws air into the containment chamber from outside of the preexisting space (e.g., outdoors).

In some embodiments, the first air filtration system and the second air filtration system provide about 1-25 changes per hour of the air inside containment chamber, preferably, from about 10-12 changes per hour of the air inside containment chamber.

In other embodiments, negative pressurization in the containment chamber is provided by a single air filtration system that exhausts air from the containment chamber as intake air is drawn through a filter (e.g., HEPA, ULPA, electrostatic, charcoal, and the like).

In preferred embodiments of the present invention, an interlock shutoff is provided between the first air filtration system (e.g., exhaust) and the second air filtration system (e.g., intake) sufficient to prevent the containment chamber from becoming positively pressurized relative to preexisting space. Other preferred embodiments provide balanced air intake and exhaust.

In preferred embodiments, the containment chamber further comprises modular wall and ceiling panels. In other embodiments, the containment chamber(s) further comprise modular floor panels. In preferred embodiments, the modular wall panels, modular ceiling panels, and modular floor panels are nonporous. In preferred embodiments, the nonporous modular wall panels, modular ceiling panels, and modular floor panels are disinfectable.

The present invention further provides a containment chamber that is disinfectable (e.g., gas disinfection). The present invention is not limited by the type of disinfection used.

In still other embodiments, the containment chambers further comprise biological safety cabinets/hoods.

Some embodiments of the present invention provide containment chamber apparatus which are towed by, or enclosed within, motor vehicles (e.g., trucks, airplanes, helicopters, ships, etc.). The present invention contemplates that two, three, four, . . . or more, containment units can be deployed in suitable preexisting spaces.

In some embodiments, the containment chamber(s) of the present invention are configured for employment (e.g., installed) in a preexisting space (e.g., a room in a building or the facility, a vehicle, or a trailer, etc.).

In some other embodiments, an outer chamber that holds (e.g., encloses) one or more containment chamber is also provided as a part of some biological containment apparatuses. In some embodiments, the outer chamber and the inner chamber(s), enclosed therein, are configured for employment (e.g., installed) inside of a preexisting space, such as a building, facility, vehicle, or a trailer. In further embodiments, the outer chamber further comprises a biological containment chamber.

In preferred embodiments, the inner chamber comprises at least one air filtration system. In particularly preferred embodiments, the inner chamber comprises a first air filtration system and a second air filtration system.

In some embodiments, the inner chamber of the biological containment apparatuses comprises a space accommodating a bed for a patient with an infectious disease.

In other preferred embodiments, the outer chamber comprises an air exchange system. In some of these embodiments, the air exchange system further comprises at least one air filtration system.

In some embodiments, the present invention provides an apparatus comprising an outer chamber comprising an air exchange system wherein the air exchange system exchanges the air within the outer chamber with air from outside of the outer chamber and a sealable portal; an inner chamber inside the outer chamber comprising a first air filtration system and a second air filtration system, wherein the first air filtration system exhausts air from inside the inner chamber and the second air filtration system draws air into the inner chamber and a sealable portal; and an air pressurization system wherein the air pressurization system provides negative pressurization in the outer chamber and the inner chamber. In preferred embodiments, the outer chamber has a lockable entry or controlled access system.

The present invention contemplates that the air pressurization within the inner chamber be more negative than the air pressurization within the outer chamber. In preferred embodiments of the present invention, an interlock shutoff is provided between the first air filtration system (e.g., exhaust) and the second air filtration system (e.g., intake) sufficient to prevent the inner chamber from becoming positively pressurized relative to outer chamber. Other preferred embodiments provide balanced air intake and exhaust.

In other embodiments, negative pressurization in the inner chamber is provided by a single air filtration system that exhausts air from the inner chamber as intake air is drawn through a filter (e.g., HEPA, ULPA, electrostatic, charcoal, and the like).

The present invention is not limited to any particular number or arrangement of containment chambers. Indeed, a variety of containment chamber arrangements are contemplated including, but not limited to, two, three, four, . . . etc. additional inner containment chambers being enclosed in one central large outer containment chamber. Multiple groups of the containment chamber arrangements (e.g., multiple outer chamber enclosing one or more inner chambers) are also specifically contemplated.

Some embodiments of the present invention provide containment chamber apparatuses which are towed by, or enclosed within, motor vehicles (e.g., trucks, airplanes, helicopters, ships, etc.).

In preferred embodiments, the containment chamber(s) apparatus comprise one or more air filter systems (e.g., intake and/or exhaust). In some embodiments, air exhausted from the chamber(s) is filtered. In some other embodiments, air drawn into the chamber(s) is filtered. In preferred embodiments, provide air filtration systems for intake and exhaust air. For example, some embodiments comprise air filtration systems that filter particles 0.3 μm and greater (e.g., HEPA filters). In other embodiments, the containment chamber apparatus comprise air filtration systems that filter particles 0.128 μm and greater (e.g., ULPA filters). The present invention is not limited to any particular air filtration systems or to filtering any particular particulates (e.g., microorganism, viruses, etc.) aerosols, or gases. Furthermore, the present invention specifically contemplates using HEPA, ULPA, electrostatic, and/or charcoal filters, and the like, either in single filter units or in combinations.

In some embodiments, a first (or more) air filtration system exhausts air from inside the inner chamber(s) to the interior of the outer chamber. In other embodiments, a first (or more) air filtration system exhausts air from inside the inner chamber(s) to the exterior of the outer chamber.

In additional embodiments, a second (or more) air filtration system draws air into the inner chamber(s) from interior of the outer chamber. In yet other embodiments, a second (or more) air filtration system draws air into the inner chamber from the exterior of the outer chamber.

The present invention is not limited to any particular air filtration exhaust or intake scheme. Indeed, in some embodiments, filtered air is exhausted to the outdoors. In other embodiments, outdoor air is filtered and then directed into the apparatus. In preferred embodiments, the air handling, filtration, pressurization, and exchange systems used in the present invention are designed and provided to operate in compliance with biological containment guidelines, for example, U.S. Public Health Service Centers for Disease Control.

The present invention also provides systems for providing from about 1 to 25 more air changes per hour in the various chambers of the apparatus. For example, in some embodiments, one or more opposing air handling systems (e.g., exhaust air filtration systems versus intake air filtration systems) provide from about 1 to 25 or more air changes per hour, and preferably from about 12-14 air changes per hour.

In some embodiments, the apparatus further comprises at least one air exchange system providing from about 1-25 or more air changes per hour in an containment chamber(s). In preferred embodiments, the apparatus further comprises at least one air exchange system providing from about 10-12 air changes per hour in an containment chamber(s). The present invention is not limited to any particular air exchange scheme or frequency of air exchanges.

In preferred embodiments, the containment chamber(s) of the present invention provide negative pressurization. Accordingly, in preferred embodiments, the present invention provides air pressurization systems providing from about −1.0 inches of water to about −0.001 inches of water, and preferably, about −0.05 inches of water of negative air pressurization in a containment chamber(s). In some embodiments, air exchange systems further comprise one or more air filtration systems (e.g., HEPA, ULPA, electrostatic, charcoal, or air scrubbers, etc.). In preferred embodiments, air filtration systems are accessible from outside of the containment chamber(s). In other preferred embodiments, air filtering systems are accessible/decontaminated from within the chamber(s).

The present invention also provides sealable portals (e.g., door, pass-throughs, etc.) between the several containment chambers that comprise a particular embodiment of the present invention. In preferred embodiments, the sealable portals comprise a gasket (e.g., rubber, neoprene, silicone, etc.). The present invention is not limited to any particular seals or gaskets used with the portals or any other penetrations of the containment chamber panels.

The present invention also provides lighting fixtures in the containment chambers. In some embodiments, the lighting fixtures comprise fluorescent fixtures. However, the present invention is not intended to be limited to embodiments using fluorescent lighting fixtures. Indeed, a number of other lighting fixtures are contemplated, including, but not limited to, incandescent, halogen, mercury vapor, dark room lighting, UV, etc. The present invention contemplates that selected lighting fixtures will not disrupt air pressurization (e.g., negative air pressurization), or flow (e.g., laminar flow) with the containment chamber(s). In preferred embodiments, lighting fixtures and necessary utilities are hung inside the containment chambers so as to minimize the number of chamber penetrations. In other embodiments, transparent ceiling (or wall) panels allow entry of light from lighting fixtures positioned outside of the containment chambers.

In preferred embodiments, the present invention provides modular containment chamber panels (e.g., modular wall and ceiling panels). In further embodiments, the present invention further provides modular floor panels. The modular panels preferably further comprise modular service and utility (e.g., $CO_2$ $N_2$, $O_2$, air, water, vacuum, propane, electrical, data, communications, and networking lines, and the like) hook-ups and connections (e.g., raceways, conduits, pipes, ducts, wiring, and the like). The present invention contemplates that in some embodiments modular panel construction limits the number of chamber penetrations to preferably one (two, three, four, . . . or more penetrations are possible though less preferred) sealed (e.g., using silicone caulking) penetration point. The present invention is not intended to be limited to limited to embodiments providing modular containment panel construction. In preferred embodiments, the containment chamber(s) of the present invention are constructed of nonporous materials (or coated with suitable nonporous coatings) that resist supporting microbial growth and that preferably withstand disinfection/sterilization (e.g., gas sterilization).

In other preferred embodiments, the present invention provides one or more valves for distributing disinfectants (e.g., formaldehyde gas) inside of the containment chamber(s).

In still other preferred embodiments, the present invention contemplates containing one or more biological safety hoods/chambers within the containment chamber(s) of the disclosed apparatus.

DEFINITIONS

To facilitate an understanding of the present invention, a number of terms and phrases are defined below.

As used herein, the term "air exchange system" refers to a system for exchanging the air within a room (e.g., a containment chamber). Air exchange systems optionally include one or more air filters (e.g., HEPA, ULPA, electrostatic, or charcoal filters and the like).

As used herein, the term "air filtration system" refers to a system for filtering the air being exhausted from, or supplied to, a room (e.g., a containment chamber). The filters used within air filtration systems include, but are not limited to, HEPA, ULPA, electrostatic, or charcoal filters and the like.

The term "air pressurization system," as used herein, refers to a system that provides negative air pressure within a room (e.g., a containment chamber). The term also refers to systems used to monitor and adjust air pressurization within a room. Air pressurization systems can optionally include one or more air filters (e.g., HEPA, ULPA, electrostatic, or charcoal filters, and the like).

As used herein, the term "sealable portal" refers in its broadest sense to devices (e.g., doors, pass-thru portals, etc.) that allow the user of the disclosed biological containment apparatus to ingress/egress from one containment chamber to the next, or to exit to outside of the disclosed apparatus. Optionally, pass thru portals can be used to enter materials into chamber. Sealable portals optionally include systems (e.g., neoprene or rubber gasket(s)) that substantially prevent the flow of air and microorganism through the portal when the portal is in the closed and sealed position.

DESCRIPTION OF THE INVENTION

The present invention relates to apparatus and systems for isolating hazardous agents and organisms from their handlers and the public. In particular, the present invention relates to modular negative pressure biological containment chambers.

Some preferred embodiments of the present invention comprise one, two, three, four, . . . or more, containment units deployed within an existing space.

Other preferred embodiments of the present invention comprise one or more biological containment chambers (e.g., two, three, four, or more, inner chambers, enclosed within one or more outer chambers) wherein negative pressurization is provided in one or more of the provided chamber(s). In some preferred embodiments, the inner containment chambers are arranged side-by-side within the outer chamber.

Preferred embodiments of the present invention provide a modular high-level (e.g., BSL2, BSL 3,or greater) biocontainment system suitable for use in laboratories and in mail handling and receiving facilities. The modular design addresses the need to rapidly expand laboratory capability, either by new construction or by retrofitting higher levels of containment into existing spaces.

In other embodiments, the present invention provides trailerable biological containment chambers providing negative pressurization and ultra air purification (e.g., HEPA, ULPA, electrostatic, and/or charcoal filter, etc.).

In preferred embodiments, the biological containment and containment chambers of the present invention are designed to be rapidly installed and commissioned to comply with U.S. Public Health Service Center for Disease Control (CDC) Level 3,or greater, guidelines regarding biosafety and containment. It is contemplated that the some (e.g. inner chamber with filtered exhaust to outside of building) modular units of the present invention are appropriate for use in mail handling facilities In other embodiments, the biological containment and containment chambers of the present invention are designed to be rapidly installed and commissioned to provide biological containment and containment facilities for mailrooms in both public and private settings (e.g., government installations and commercial enterprises).

Preferred embodiments of the present invention address the need to provide biological containment and containment capabilities at facilities that have not traditionally been designed with containment of biological hazards in mind. For example, current U.S. Post Offices typically fail to provide controlled ventilation gradients and systems and devices to isolate contaminated mail for review and/or decontamination. U.S. Post Offices also typically fail to provide sufficient control of visitor access to mail sorting and handling areas. Various embodiments of the present invention address these shortcomings by providing readily assembled high level (e.g., BSL 3 or greater) biological containment and containment chambers.

In some embodiments, the inner chamber of the present invention comprises a patient isolation room. In this embodiment, a second door to the inner chamber is added that facilitates the entry of a standard hospital and which can then be sealed to provide containment of the patient. It is contemplated that this system will find use in the treatment of patients that pose the risk of transmitting virulent diseases such as Severe Acute Respiratory Syndrome (SARS).

In one embodiment, the present invention provides a contained work area that is maintained under negative pressure and from which exhaust air is HEPA filtered and discharged outside of a building.

In preferred embodiments, the disclosed containment chambers are constructed from modular chamber panels designed to minimize the number of penetrations into the panels that have to be sealed while still providing convenient distribution of utilities and services for operating typical laboratory equipment (e.g., biosafety cabinets and incubators) operated within the chambers.

In other preferred embodiments, the present invention comprises lockable (e.g., controlled access) double entry portals that allow containment chamber users to change potentially contaminated clothing and gowns prior to leaving the protective confines of the chamber. The present invention is not limited however to any particular locking devices or access control systems. In still other preferred embodiments, the present invention provides containment chambers/modules that fully comply with existing CDC recommendations for BSL3 containment spaces. In certain preferred embodiments, an inner (e.g., a second chamber) containment module is placed within an outer containment module (e.g., a first chamber) wherein the outer containment chamber preferentially provides restricted access (e.g., controlled entry) and other laboratory features (e.g., an autoclave and hand wash sink). hi some embodiments, the inner containment chamber(s) further comprise benchwork and/or biosafety cabinets, and the like. In some of embodiments, the benchwork and/or biosafety cabinets, and the like, are frame hung.

In additional preferred embodiments, multiple adjacent containment modules are assembled thus providing the user with the ability to work with multiple agents or to conduct multiple tests in parallel. The unitary assembly of the modules facilitates their use in retrofitting existing facilities and in rapidly reconfiguring for changed needs. In preferred embodiments, the modules are constructed of materials that withstand cleaning by a wide variety of disinfectants and that can be decontaminated using (e.g., formaldehyde gas) in the event of a spill.

In certain embodiments (e.g., designed for mailroom use) one or more laminar flow workbenches are installed to provide the user (e.g., mail handler) primary protection when inside the containment module. Additionally, in other embodiments, HEPA and/or ULPA filters are provided to supply filtered air into/exhausted from the chamber. In preferred embodiments, in the event a suspect package is opened, the worker can safely exit the chamber without placing coworkers at risk while the package is retained for subsequent decontamination.

In some embodiments, an outer biological containment chamber (e.g., a first chamber) encloses an inner (e.g., a second chamber) biological containment chamber(s). Accordingly, in some embodiments an outer biological containment chamber encloses additional second, third, fourth, . . . etc., inner biological containment chambers.

However, in other embodiments, the outer biological containment chamber encloses only a single inner biological containment chamber. The present invention is not limited however by the number or arrangement of outer, and first, second, third, or more inner biological containment chambers used in a particular embodiment or application. Indeed, the present invention contemplates a modular system of containment chambers wherein each individual chamber is further comprised of modular panel and sections (e.g., wall, floor, and ceiling panels, corner, and portal sections, etc.). The modular construction of the biological containment chambers found in preferred embodiments provides the user maximum flexibility to design custom biological safety containment workspaces. Moreover, the modular containment chamber embodiments of the present invention provide economy of manufacture. Modular containment chamber panels allow the user to assemble and install complete containment chambers more quickly than corresponding non-modular designs. In some embodiments, the modular containment chamber panels are interchangeable. In some embodiments, panels are removable to allow for the entry and installation of large equipment.

In other preferred embodiments, the modular containment chamber panels further comprise modular service and utility connections and/or hookups (e.g., raceways, conduit, pipes, duct work, etc.) for gas (e.g., propane, $CO_2$, $N_2$, $O_2$, etc.), air, vacuum, water, electrical, data, communications, and computer networking lines (e.g., fiber optics, coaxial cable, Ethernet, etc.). In some embodiments, when necessary, the modular service and utility connections and/or hookups are isolated from contamination by suitable in-line filters (e.g., HEPA filters) or disinfectant traps. In other embodiments, the number of modular connections/hookups penetrating the modular panels is reduced by the use of portable equipment to provide services within the containment chambers (e.g., pressurized gas tanks, battery packs, portable vacuum generators, etc.). In particularly preferred embodiments, every penetration of the containment chamber is sealed with one or more types of protective nonporous sealing materials, for example, caulking (e.g., silicone), flashing, and gaskets (e.g., rubber, silicone, neoprene, etc.). In still other embodiments, modular connections and/or hookups for potentially dangerous utilities and services (e.g., electricity, propane, $O_2$, etc.) are provided with emergency service interrupts (e.g., circuit breakers, kill switches, valves, and the like). In still other embodiments, the containment chambers are provided with fire detection and suppression systems.

Preferred embodiments of the present invention further provide sufficient lighting within the containment chambers to provide sufficient illumination and elimination of shadows for all contemplated tasks. In some embodiments, lighting fixtures are flush mounted and sealed (e.g., with silicone caulking) to prevent disruption of laminar airflow patterns. In still other embodiments, lighting fixtures and utilities are hung inside of the chambers so as to minimize the number of penetrations into the chamber panels. Where directional or suspended lighting fixtures are employed, the fixtures are selected for optimal operational safety, aerodynamics, and other considerations. In other embodiments, transparent ceiling (or wall) panels allow entry of light from lighting fixtures positioned outside of the containment chambers. In some embodiments, lighting fixtures comprise fluorescent, halogen, incandescent lighting, etc.

In regard to containment chamber sterilization and disinfection, the present invention contemplates a number of embodiments. In some embodiments, the containment chambers are disinfected using sterilizing gas (e.g., formaldehyde, chlorine dioxide, ethylene oxide, $O_3$, etc.) or other chemical (e.g., glutaraldehyde, phenolic compounds, peracetic acid, alcohols, cationic detergents, etc.) sterilization systems. In other embodiments, containment chambers are disinfected using sufficient electromagnetic radiation (e.g., UV, x-rays, gamma rays, microwaves, etc.) sterilization systems. In other embodiments, the containment chambers are disinfected using heat or high pressure and heat. In preferred embodiments, one or more ports or valves are provided into the containment chambers for introducing or evacuating disinfectants/sterilants.

In preferred embodiments, air filtration, exchange, pressurization, etc., systems are serviceable from the interior of the containment chamber(s). In other preferred embodiments, the user can verify the integrity of the air filtration, exchange, pressurization, etc., systems using valved sample ports inserted into the systems (e.g., duct work) while outside of the chamber(s).

In some embodiments, the containment chamber panels are constructed of rigid materials (e.g., glass, LEXAN, metals [e.g., aluminum, steel, etc.], plastics [e.g., polycarbonates such as LEXAN, General Electric Co., Pittsfield, Mass., acrylics] ceramics, composites, etc.). In other embodiments, the containment chamber panels are constructed of non- or semirigid materials (e.g., plastic or vinyl films, metal films, etc.). Various considerations affect the choice of materials used in the construction of containment chamber panels, including, but not limited to, surface homogeneity and porosity, ability to withstand disinfectants, resistance to microbial colonization, fungal growth, particle emission and/or outgassing, corrosion, alkalis and acids, oils and hydrocarbon, organic solvents and alcohols, inorganic solvents, impacts, penetrations, and explosions, electromagnetic radiation including UV light, flammability, electrostatic considerations, and laminar flow considerations as well as suitability for the anticipated purpose, aesthetic, environmental, and manufacturing considerations. In some embodiments, materials selected for constructing the present invention are modified/augmented for a particular purpose by contacting (e.g., sealing, painting, coating, welding, bonding, etc.) the material with one or more additional materials (e.g., fluoropolymers, TEFLON, du Pont Chemical Co., Wilmington, Del., epoxy resins, and the like). Preferred materials used in the construction of the present invention provide surfaces with insufficient asperity for accumulation of biofilms and microorganisms. Additional embodiments of the present invention provide a heavy gauge non-porous vinyl sheeting that is welded to form a homogenous membrane.

The users and manufacturers of the present invention will draw upon various fields and disciplines when selecting materials and components for the construction of the present invention, including, but not limited to, manufacturing technologies, materials engineering, chemistry, biochemistry, microbiology and virology, epidemiology, physics, metallurgy, and environmental sciences. Additionally, users and manufactures of the present invention will be able to easily determine optimal construction materials and components for use in the present invention following no more than routine experimental procedures.

In preferred embodiments, the interior surfaces of the containment chamber panels are finished (e.g., silicone caulking) to provide smooth junctions between the modular wall, ceiling, and floor panels when assembled. All penetrations (e.g., service connections and outlets, lighting fixtures, pass through, portals, windows, etc.) into the containment chamber panels should be finished to provide smooth junctions (e.g., sealed with silicone caulking). In some embodiments, the corners of the containment chamber(s) are coved to provide the user with more easily cleaned surfaces.

In some embodiments, internal structural members (e.g., metals, such as, aluminum honeycomb construction, and galvanized or stainless steel members, rigid plastics, such as, polyisocyanurate, and extrude polystyrenes, and the like) provide strength and rigidity to the modular panels comprising the containment chambers. In other embodiments, the panels comprising the containment chambers comprise cavities filled with one or more expandable materials (e.g., expanded polystyrene) that provide the necessary chamber strength and rigidity. In still further embodiments, attaching the modular wall, ceiling, and floor panels to one another provides panel rigidity. In yet other embodiments, panel rigidity is provided by an external skeleton of suitable material (e.g., aluminum framework) to which the panel assemblies are affixed.

In preferred embodiments of the present invention, the biological containment chambers comprise one or more air filtration systems and/or air exchange systems. In some embodiments, a first inner (or second, third, fourth, fifth, ... etc., inner chamber) containment chamber enclosed within an outer containment chamber, comprises a first air filtration system that exhausts air from inside the first inner (or second, third, fourth, fifth, ... etc., inner chamber) containment chamber, and a second air filtration system that draws air into the first inner (or second, third, fourth, fifth, ... etc., inner chamber) containment chamber from outside of that chamber. In some embodiments, the air filtration systems comprise a filter of particles of about 0.3 µm and greater (e.g., HEPA filters). In other embodiments, the air filtration systems comprise a filter of particles of about 0.128 µm and greater (e.g., ULPA filter). The number or type of air filtration systems employed does not limit the present invention. Indeed, in some embodiments, air filtration systems are contemplated that filter particles from about 0.1 µm to about 0.5 µm or greater. In some embodiments, two or more types of air filtration systems are used (e.g., HEPA, ULPA, charcoal, electrostatic, scrubbers, etc.) simultaneously. In preferred embodiments, the inner containment chamber comprises an air filtration system capable of from about 1 to about 25 or more air changes per hour, preferably, from about 10 to 20 air changes per hour, and more preferably from about 12-14 air changes per hour. Some embodiments comprise one or more, air filtration systems such as the PURRFLO CH22,Flanders PrecisionAire, Inc., Detroit, Mich., or similar conforming products.

In some embodiments, the first air filtration system exhausts air into the outer containment chamber enclosing the inner chamber(s). In other embodiments, the first air filtration system exhausts air outside of the outer containment chamber enclosing the inner containment chamber(s) held therein. In a preferred embodiment, the first air filtration system exhausts air to the outdoors.

Likewise, in some embodiments, the second air filtration system air into the inner containment chamber(s) that is drawn from within the outer containment chamber. In other embodiments, the second air filtration system pumps air into the inner containment chamber(s) that is drawn from outside of the outer containment chamber. In yet other embodiments, the second air filtration system pumps air into the inner containment chamber(s) that is drawn from the outdoors. Preferred embodiments of the present invention further comprise an interlock system that prevents positive pressurization in the inner containment chamber(s).

In other preferred embodiments, the outer containment chamber (a containment chamber that encloses one or more smaller inner containment chambers) comprises an air exchange system that provides from about 1 to about 25 or more air changes per hour, preferably, from about 10 to 20 air changes per hour, and more preferably from about 10-12 air changes per hour.

In some embodiments, the air exchange system further comprises at least one filter system. In some of these embodiments, the air exchange system comprises a filter of particles of about 0.3 µm and greater (e.g., HEPA filters). In other embodiments, the air exchange system comprises a filter of particles of about 0.128 µm and greater (e.g., ULPA filter). As described above, the present invention is not limited to a particular type or number of air exchange units, nor to additionally comprising a particular type or number of filter systems.

In still other preferred embodiments, the present invention further comprises one or more air pressurization systems that provide negative pressurization in the containment chamber(s) (e.g., inner chamber(s)). In some embodiments, the negative pressurization in the containment chambers(s) is from about –1.0 inches of water to about –0.001 inches of water, and preferably, about –0.05 inches of water. In some embodiments, the air exchange systems of the present invention further comprise one or more air filtering systems (e.g., HEPA, ULPA, electrostatic, charcoal, or air scrubbers, etc.).

Some embodiments of the present further comprise alarm systems that warn the user of system failures (e.g., loss of negative pressurization, filter failure, service leaks/overloads, inadequate air changes, etc.) or other dangers (e.g., fire) or problems within the apparatus. The present invention contemplates that a number of alarm types may be used with the present invention (e.g., audible, visual, and combinations thereof) and is not limited to any particular alarm system. Alarms system may be also be used to notify authorities and first responders of problems with the apparatus. In particularly preferred embodiments, the present invention provides a system to monitor the air pressurization in the chamber(s) prior to the user entering the apparatus.

In still further embodiments, the present invention provides systems (e.g., magnetic, card swipe, of keypad) for restricting access into the containment chamber(s).

EXEMPLARY EMBODIMENTS

Exemplary embodiments of the present invention are illustrated in the following Figures and brief accompanying description.

Figure 1:
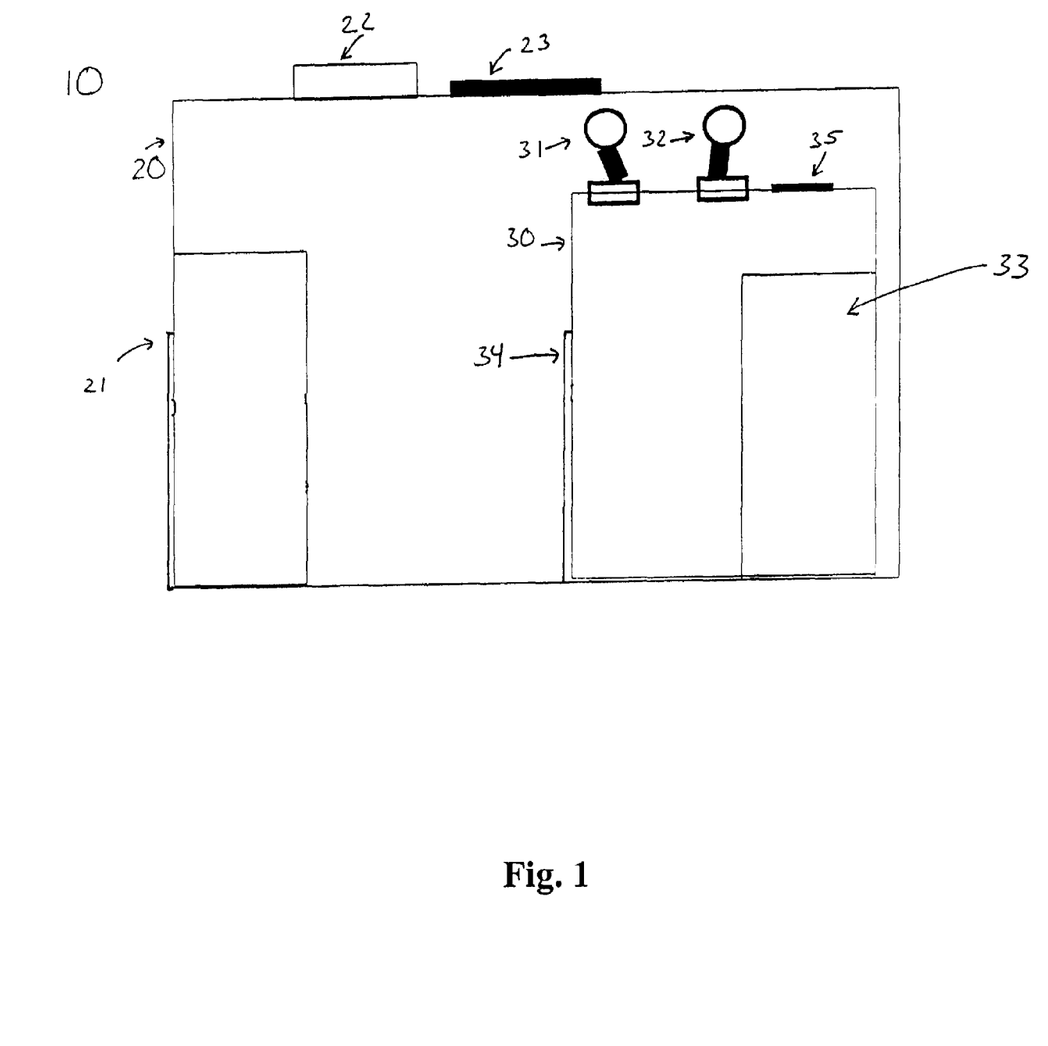
FIG. 1 provides a schematic of one embodiment of the present invention.

FIG. 1 shows biological containment apparatus 10 comprising an outer containment chamber 20 that encloses an inner containment chamber 30. In preferred embodiments, containment chamber 20 and containment chamber 30 provide negative pressurization. In some embodiments, only containment chamber 30 provides negative pressurization. While FIG. 1 is limited to showing only a single inner containment chamber 30 enclosed with outer containment chamber 20, in some embodiments, a number of additional inner containment chambers 30 are enclosed within outer containment chamber 20. Outer containment chamber 20 further comprises a sealable entry/egress portal 21. Outer containment chamber 20 further comprises an air exchange system 22 that provides containment chamber 20 with from about 1 to 25 or more room air changes per hour. Light fixture(s) 23 (e.g., fluorescent fixtures) are provided in sufficient quantity and wattage in containment chamber 20 to provide adequate illumination and to prevent shadows with in the chamber. Sealable portal 34 provides ingress/egress between containment chamber 20 and containment chamber 30 contained therein. In preferred embodiments, portals 21 and 34 when properly secured are sealed (e.g., neoprene gaskets) against air infiltration. Air filtration system 31 brings filtered (e.g., HEPA, ULPA, etc.) air into containment chamber 30, while air filtration system 32 exhausts air from containment chamber 30. Containment chamber 30 is light by light fixture(s) 35. As mentioned above in reference to light fixtures 23, sufficient numbers and wattage of lights in light fixtures 35 are provided to allow for sufficient illumination and to dissipate shadows within containment chamber 30. In some embodiments, containment chamber 30 encloses one or more biological safety chambers/hoods 33.

Figure 2:
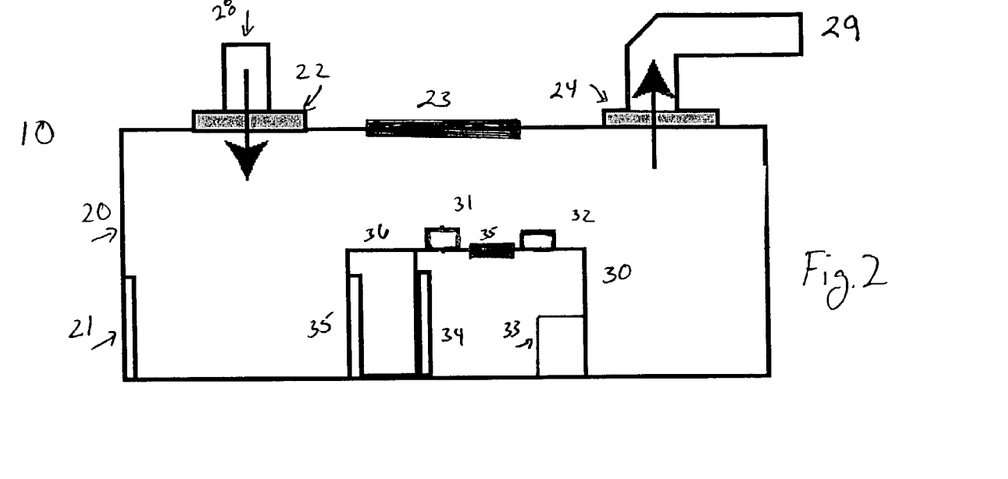
FIG. 2 provides a schematic of one embodiment of the present invention.

In FIG. 2, shows a biological containment apparatus 10 provides an anteroom 36 that is entered through sealable portal 35 which allows users a protected space to gown prior to entering inner containment chamber 30. Outer containment chamber 20 further comprises additional air exchange system 24 and duct work 28 and 29. In preferred embodiments, duct work 28 provides air intake from the exterior of outer containment chamber 20, and duct work 20 provides exhaust to the exterior of outer chamber 20 (e.g., outside).

Figure 3:
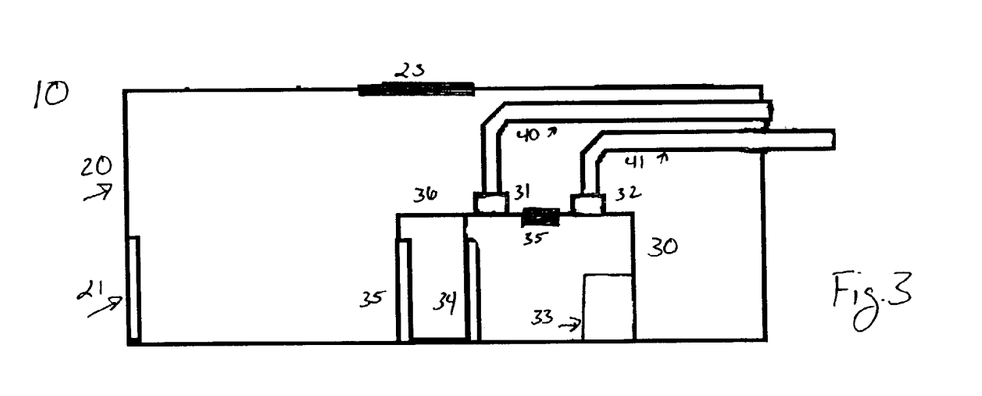
FIG. 3 provides a schematic of one embodiment of the present invention.

FIG. 3 shows duct work 40 providing a conduit for exhausted air (e.g., filtered) from air filtration system 31 to the outdoors. Duct work 41 provides a conduit for air drawn to air filtration system 32 from the outdoors.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

We claim:

1. A biological containment apparatus comprising:
    a. a containment chamber configured for employment in a preexisting space, said containment chamber comprising microorganisms contained therein, said containment chamber constructed from rigid modular wall and ceiling panels comprising utility lines selected from the group consisting of $CO_2$, $N_2$, $O_2$, air, water, vacuum, propane, electrical, data, and communication lines and combinations thereof;
    b. a first air filtration system and a second air filtration system, wherein said first air filtration system exhausts air from inside said containment chamber and said second air filtration system draws air into said containment chamber, and wherein said first air filtration system is configured to prevent said microorganisms from exiting said biological containment apparatus;
    c. a sealable portal for ingress and egress to said containment chamber; and
    d. an air pressurization system, wherein said air pressurization system provides negative pressurization in said containment chamber.

2. The biological containment chamber of claim 1, wherein said preexisting space comprises a confined space.

3. The biological containment chamber of claim 2, wherein said confined space comprises a laboratory.

4. The biological containment chamber of claim 2, wherein said confined space comprises a room in a building.

5. The biological containment chamber of claim 2, wherein said confined space comprises the interior of a motor vehicle.

6. The biological containment chamber of claim 2, wherein said confined space comprises a trailered vehicle.

7. The biological containment apparatus of claim 1, wherein said first air filtration system exhausts air from inside said containment chamber to the outdoors.

8. The biological containment apparatus of claim 1, wherein said second air filtration system draws air into said containment chamber from the outdoors.

9. The biological containment apparatus of claim 1, wherein said first air filtration system and said second air filtration system provide about 12-14 changes per hour of the air inside said containment chamber.

10. The biological containment apparatus of claim 1, wherein said first air filtration system and said second air filtration system provide a negative air pressurization of about 0.05 inches of water inside said containment chamber.

11. The biological containment apparatus of claim 1, wherein said containment chamber further comprises a port for gaseous decontamination.

12. The biological containment apparatus of claim 1, wherein said containment chamber contains a biological safety cabinet.

13. The biological containment apparatus of claim 1, wherein said first air filtration system comprises a filter of particles 0.3 µm and greater.

14. The biological containment apparatus of claim 1, wherein said second air filtration system comprises a filter of particles 0.3 µm and greater.

15. The biological containment apparatus of claim 1, comprising modular wall and ceiling panels.

16. The biological containment apparatus of claim 15, wherein said modular wall and ceiling panels are nonporous.

17. The biological containment apparatus of claim 15, wherein said nonporous modular wall and ceiling panels are disinfectable.

18. A biological containment apparatus comprising:
    a. an outer chamber configured for employment in a preexisting space comprising an air exchange system wherein said air exchange system exchanges the air within said outer chamber with air from outside of said outer chamber and a sealable portal;
    b. an inner containment chamber, fully contained inside said outer chamber said inner containment chamber comprising microorganisms, said inner containment chamber constructed from rigid modular wall and ceiling panels comprising utility lines selected from the group consisting of $CO_2$, $N_2$, $O_2$, air, water, vacuum, propane, electrical, data, and communication lines and combinations thereof, and said inner containment chamber further comprising a first air filtration system and a second air filtration system, wherein said first air filtration system exhausts air from inside said inner chamber and said second air filtration system draws air into said inner chamber and a sealable portal, wherein said first air filtration system is configured to prevent escape of said microorganisms from said inner containment chamber; and c. an air pressurization system, wherein said air pressurization system provides negative pressurization in said outer chamber and said inner chamber.

19. The biological containment apparatus of claim 18 in which the inner chamber comprises a space accommodating a bed for a patient with an infectious disease.

* * * * *